United States Patent [19]

Regehr et al.

[11] 4,386,359
[45] May 31, 1983

[54] LINE PRINTER ATTACHMENT

[75] Inventors: John L. Regehr, Stewartville; Phillip C. Schloss, Rochester, both of Minn.

[73] Assignee: International Business Machines Corporation, Armonk, N.Y.

[21] Appl. No.: 336,649

[22] Filed: Jan. 4, 1982

[51] Int. Cl.³ ............................................. G01D 9/00
[52] U.S. Cl. ..................................... 346/35; 340/716
[58] Field of Search ............ 346/35, 76 PH; 340/716, 340/798

[56] References Cited

U.S. PATENT DOCUMENTS 4,334,231 6/1982 Regehr ................................. 346/35

Primary Examiner—Michael L. Gellner
Assistant Examiner—Todd E. DeBoer
Attorney, Agent, or Firm—Donald F. Voss

[57] ABSTRACT

A line printer attachment for converting a display screen copier printer to a line printer. The last or extra line of the display is used as the line print buffer. An initiate print signal is generated upon detecting that the last or extra line is to be scanned. The initiate print signal is used to blank or inhibit the serial video data from the display screen and to enable the printer. The serial video data is constantly sent to the printer attachment but is ignored until the printer is enabled. With the printer enabled, printing takes place using the line print buffer data which has been serialized as serial video data. The print buffer data remains unchanged during the entire printing of the line where the printing is done in series of horizontal lines to complete the printing of a line. At the end of each horizontal line of print a vertical screen retrace occurs and the display screen is swept where again the last or extra line is detected and another initiate print signal is generated. The next horizontal line of the series of horizontal lines for completing a line of print is printed and the operation repeats until an entire line of printing is completed.

6 Claims, 8 Drawing Figures

| FIG. 3a | FIG. 3b | FIG. 3c |

4,386,359

LINE PRINTER ATTACHMENT

TECHNICAL FIELD

This invention relates to a line printer attachment and particularly to a line printer attachment in a system including a display screen terminal.

BACKGROUND ART

Normally line printers are independent of display screen terminals. A line printer is a printer which is furnished a line of print data at a time. The entire line of print is usually buffered because the line of print data is sent to the printer at very high speeds compared to the speed of operation of the printer. Once the data has been transferred, the line printer performs the printing operation at its own speed and then signals, usually by way of an interrupt, that it has finished printing the line. Line printers can attach to the same interface as display screen terminals but heretofore none have been known to be attached to a display screen terminal itself where the display screen terminal still functions in its normal manner. Display screen copier printers, however, are known to be attached to display screen terminals; for example, as in commonly assigned copending application, Ser. No. 144,499 by J. Regehr filed 4/28/80. The present invention modifies the display screen printer attachment so as to enable the display screen printer to operate as a line printer. This modification provides a line printer at a very low cost because as with the display screen copier printer, the controls and timing circuitry of the display screen terminal are used thereby eliminating the cost of such circuitry. Also storage in the display screen terminal is used as the print line buffer and the need for duplicating such storage is also eliminated.

DISCLOSURE OF THE INVENTION

A line printer attachment for attaching a line printer to a display screen terminal controls a line printer for printing data independent of the display screen terminal but yet using the display screen terminal as a print line buffer. The line of print data for the line printer is serialized by the circuitry of the display screen terminal and when the horizontal raster scan of the display screen terminal reaches its last or extra line, the line printer attachment generates an initiate print signal which effectively blanks the serial video data from the display screen and enables the line printer which then prints the first horizontal line of dots of the print line using the serial video data serialized for it by the display screen terminal. After the first line of horizontal dots for the print line have been printed, the display screen terminal again functions in its normal manner until the last or extra line is again reached. The display screen is then again blanked and the line printer is again enabled whereby the second line of horizontal dots of the print line are printed; the line printer attachment determines which serial video data is to be printed. The process repeats until all lines of horizontal dots are printed to complete the printing of a line.

DESCRIPTION OF THE INVENTION

Figure 1:
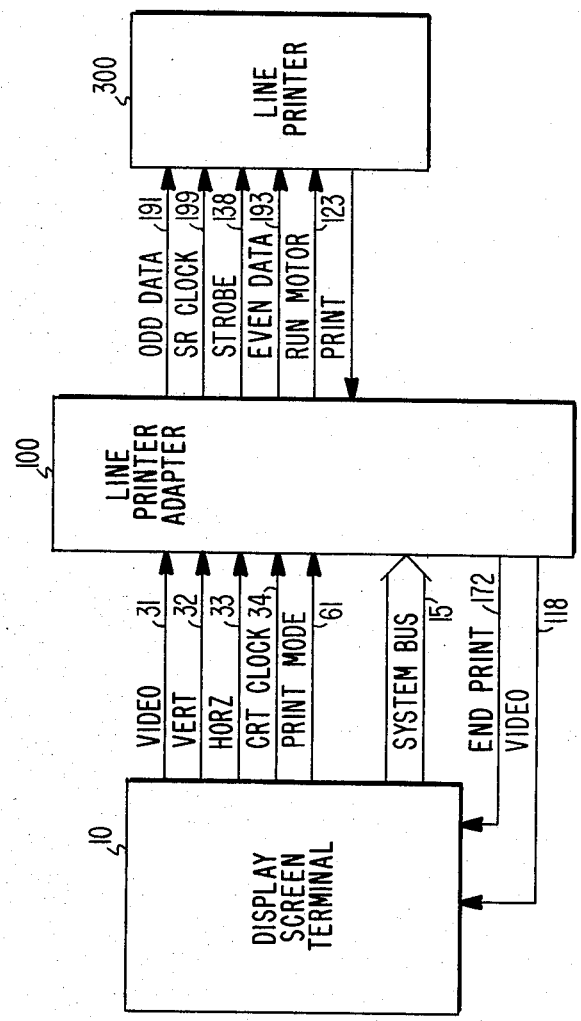
FIG. 1 is a schematic diagram illustrating the line printer adapter incorporating the present invention as being connected between the display screen terminal and the line printer.

With reference to the drawings, and particularly to FIG. 1, the invention is shown as being incorporated in a system which includes display screen terminal 10, line printer adapter 100 and line printer 300. Display screen terminal 10, FIG. 2, includes a microprocessing unit (MPU) 11 which is connected by bus 15 to address display storage 20 for among other things, transferring a line of data to cathode ray tube (CRT) controller 25. The lines of data to be printed by printer 300 are stored in display storage 20 and then transferred under control of microprocessor 11 into a line buffer in CRT controller 25. Line printer adapter 100 monitors the system bus 15 to determine when data is written into display storage 20 at a location which is assigned to the last line to be displayed on cathode ray tube 40. This last line is normally a line for displaying status information but when the system is operating in the print mode it is not displayed and, instead, the video data is printed.

Figure 2:
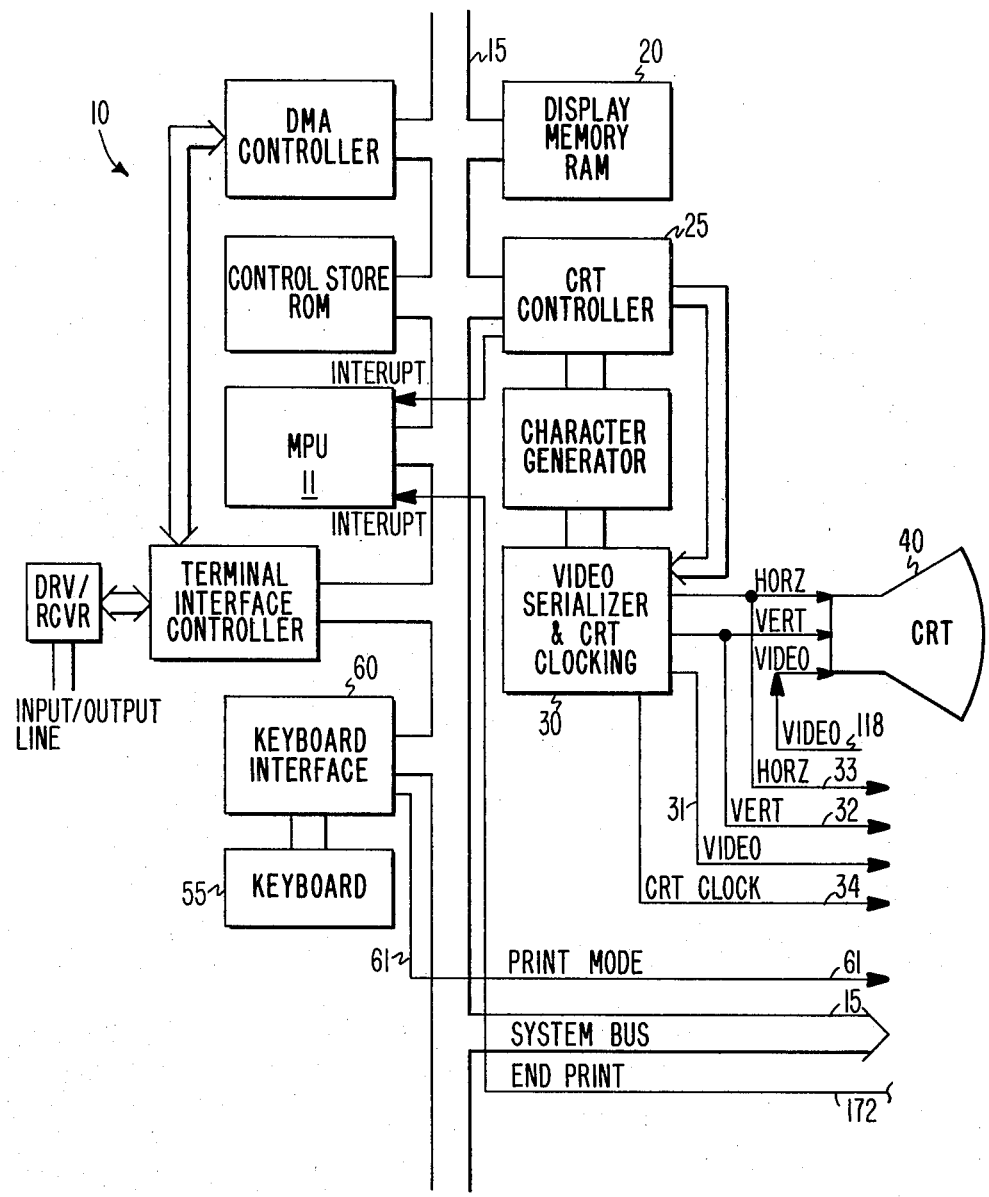
FIG. 2 is a schematic block diagram of the display screen terminal.
Figure 3A:
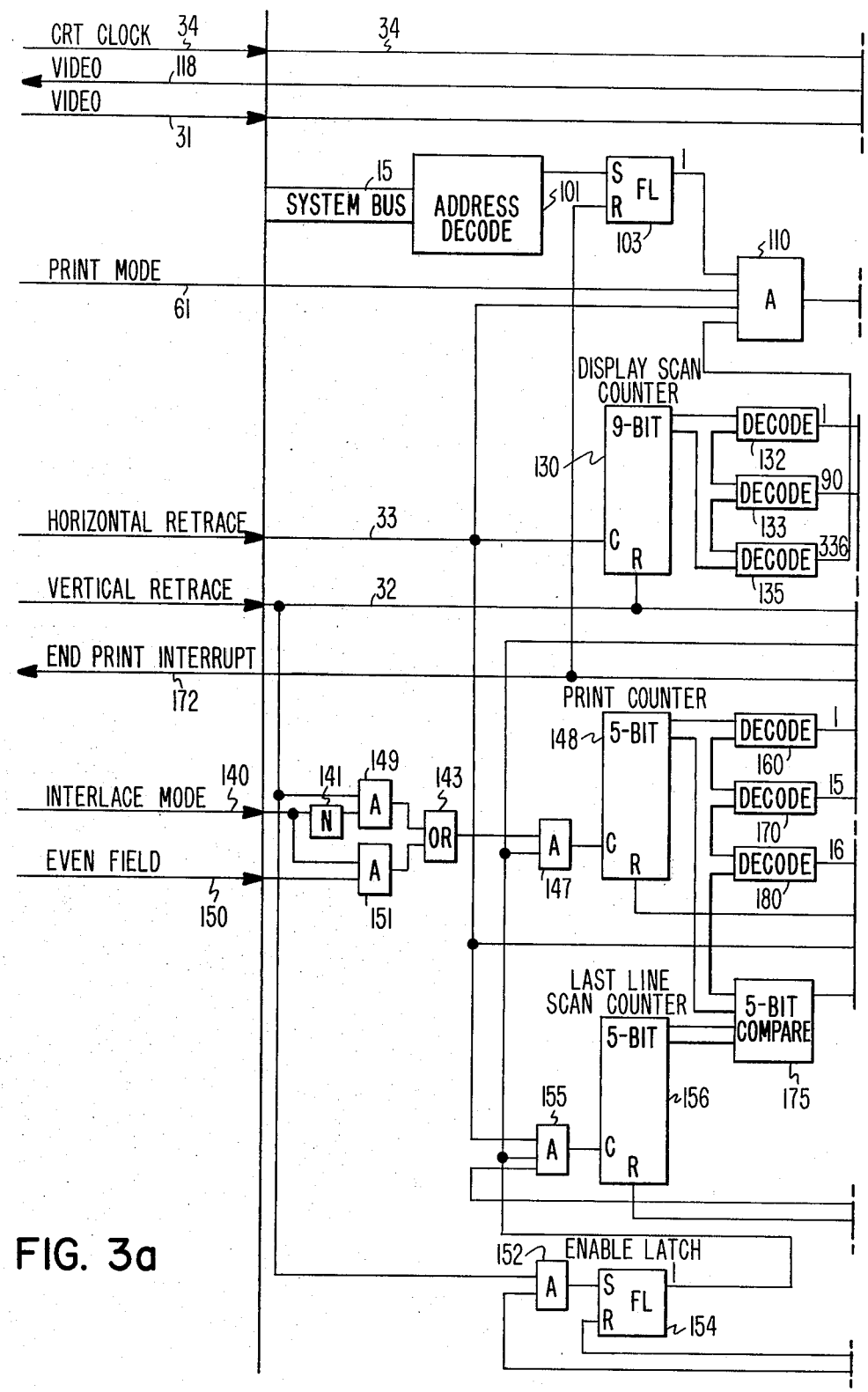
FIGS. 3a, 3b and 3c taken together as in FIG. 3 are a schematic diagram illustrating the line printer adapter shown in block form in FIG. 1.
Figure 3B:
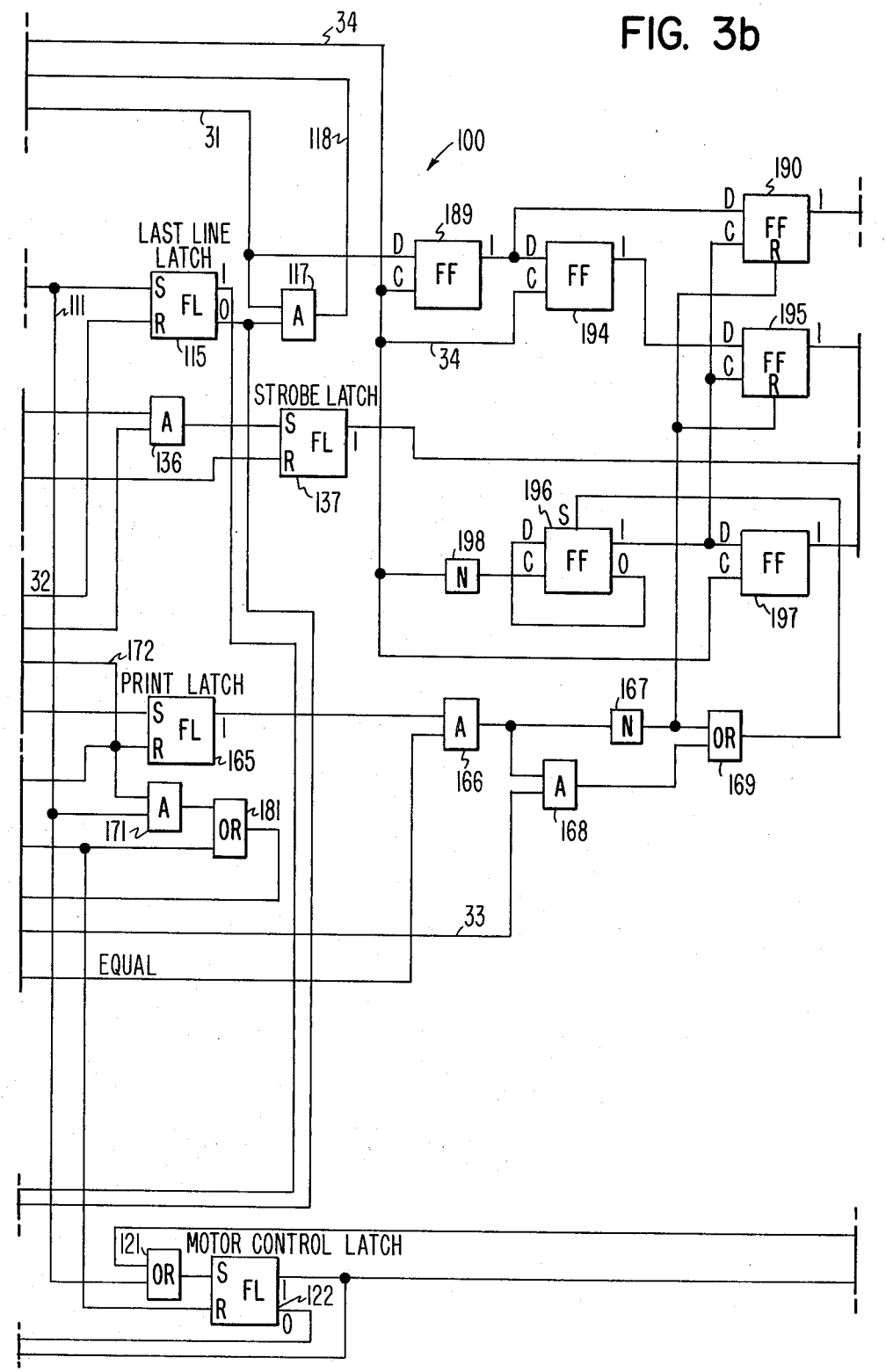
Figure 3C:
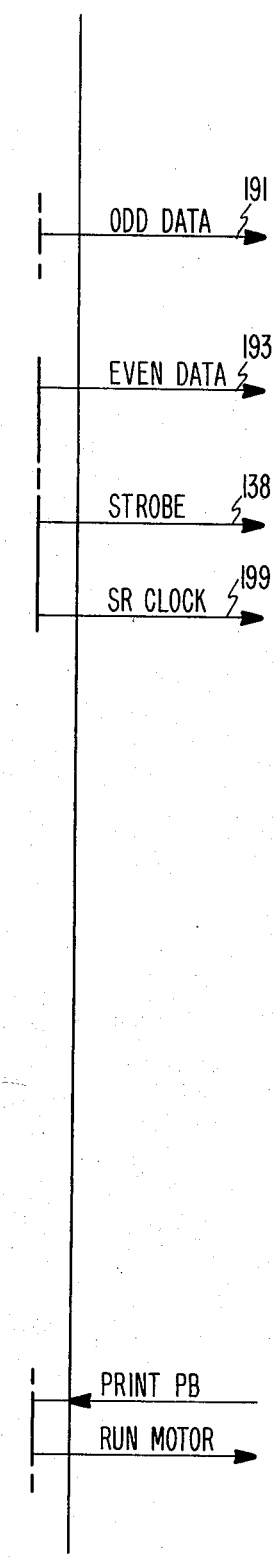
Figure 3:
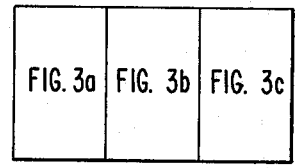
FIG. 3 is a diagram illustrating the arrangement of FIGS. 3a, 3b and 3c.

The line printer adapter 100, FIGS. 1 and 3b, monitors system bus 15 through the facility of address decode 101 to determine when data is written into storage 20, FIG. 2, at a location normally buffering the status line or row of information. Whenever address decode 101 detects an address for this location it provides an output to set latch 103. The set output of latch 103 conditions AND circuit 110 which has an output for setting latch 115 which, upon being set, blocks video data from CRT 40 via AND circuit 117. The reset output of latch 115 is applied to AND circuit 117. AND circuit 117 receives video data from video serializer and CRT clocking circuit 30, FIG. 2 over line 31. AND circuit 110 is able to set latch 115 only when the system is operating in a print mode whereby a print mode signal is present on line 61. Keyboard 55 is selectively operable by an operator to place the system in a print mode via keyboard interface 60. AND circuit 110 does not pass a signal to set latch 115 until the last line of CRT 40 has been reached and then only at horizontal retrace time.

It is thus seen that the video data on line 31 from video serializer and CRT clocking circuitry 30 is applied to CRT 40 via AND circuit 117 and line 118 so long as latch 115 is not set. Thus CRT 40 functions to display data in its normal manner until the last line is reached if the system is operating in a print mode. When the last line is reached and at horizontal retrace time and if latch 103 has been set, then latch 115 is set to block the video data from CRT 40.

Detection of the fact that the last line is to be displayed is used to initiate a print operation. The signal passed by AND circuit 110 is the initiate print signal and it is applied over line 111 via OR circuit 121 to set the motor control latch 122. The set output of motor control latch 122 provides a Run Motor signal which is applied to motor 351 in FIG. 5 for operating printer 300 in the same manner as described in the reference patent application Ser. No. 144,499. In this instance, however, motor 351 is started in response to the print initiate signal rather than the print signal generated in response to operation of push button 309, FIG. 5.

The initiate print signal on line 111, of course, is only present when display scan counter 130, FIG. 3a, has reached a value as determined by decode 135 indicating the start of the last line. The last line, i.e. the line of data to be printed by printer 300, consists of a plurality of horizontal scans and, in this example, consists of 14 horizontal scans as illustrated by the timing diagram of FIG. 4. For each scan of the last line, a horizontal row of dots is printed. No printing takes place the first time the last line is detected. Time is required for the printer motor 351 to come up to speed. The CRT 40; however, is blanked while the last line is being scanned. Thereafter, there is a vertical retrace and eventually the last line will again be scanned. The video data corresponding to the first scan of the last line is sent to the printer 300, as will be described shortly; and then printing of a horizontal row of dots takes place based upon the serial video data of the first scan of the last line. Scanning of the remaining scans of the last line is allowed to complete in a normal manner without any printing thereof. Another vertical retrace occurs after the last line has been scanned and eventually the last line is again detected. This time the serial video data for the first scan of the last line is ignored, but the serial video data for the second scan of the last line is printed as a horizontal row of dots. The serial video data for the remaining scans of the last line are also ignored as scanning thereof continues. Another vertical retrace occurs and the process repeats until all scans of the last line are printed. If another line of data is to be printed the printer motor 351 remains energized, otherwise it is stopped.

Figure 4:
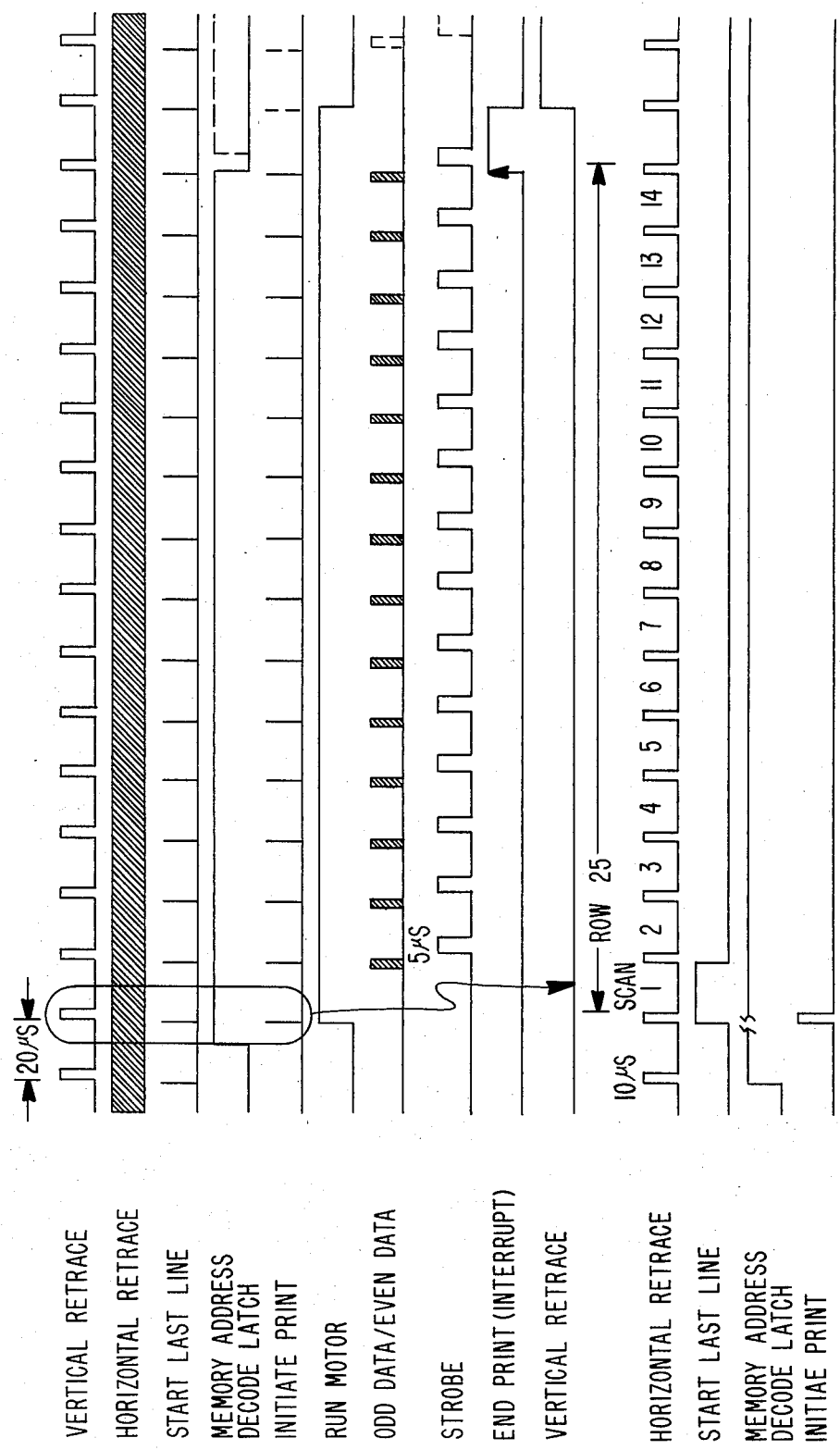
FIG. 4 is a timing diagram.

In FIG. 4 it is seen that upon detection of the last line the initiate print signal is generated, the memory address decode latch 103 having been previously set, and the run motor latch 122 is set. With the run motor latch 122 set, in addition to run motor 351 being started, AND circuit 152 is conditioned by the set output of latch 122. The output of AND circuit 152 controls the setting of enable latch 154 which is set when a vertical retrace signal is applied over line 32 to circuit 152.

The output of the enable latch 154 is applied to condition AND circuits 147 and 155. AND circuit 147 controls the clocking of print counter 148 and AND circuit 155 controls the clocking of scan counter 156. Print counter 148 is advanced by the vertical retrace signal which comes from the video serializer and CRT clocking circuit 30 over line 32. The vertical retrace signal is applied to AND circuit 149 which is conditioned by the output of inverter 141. Inverter 141 is connected to receive the interlace mode signal on line 140. The output of AND circuit 149 is applied to AND circuit 147 via OR circuit 143. OR circuit 143 also has in input from AND circuit 151 which has an input for receiving the Interlace Mode signal on line 140 and an input for receiving an Even Field signal on line 150. In this particular instance it is assumed that the operation that is taking place is in a noninterlaced mode and thus print counter 148 is advanced for each vertical retrace via AND circuit 149, OR circuit 143 and AND circuit 147. The print counter will thus have a value of 1 and this value is decoded by decode 160 which has its output connected to set print latch 165.

The set output of print latch 165 conditions AND circuit 166 which also has an input from 5 bit compare circuit 175. Compare circuit 175 functions to compare the output of print counter 148 with the output of last line scan counter 156. Last line scan counter 156, however, does not count horizontal scans until the last line has been reached, i.e., last line latch 115 has been set. The set output of latch 115 is applied to AND circuit 155. Thus there is a compare, with print counter 148 having a value of 1, when last line scan counter 156 reaches a value of 1. AND circuit 166 will then pass a signal and it will no longer hold flip-flops 190 and 195 reset via inverter 167.

Flip-flops 190 and 195 receive serial video data from flip-flops 189 and 194 respectively, these flip-flops being clocked by the CRT clock signal on line 34. Thus, until AND circuit 166 passes a signal, the serial video data is not made available to the printer 300 and is ignored by printer attachment 100.

The CRT clock signal on line 34 is also applied to flip-flop 196 via inverter 198 and directly to flip-flop 197. The output of flip-flop 196 provides the clocking to flip-flops 190 and 195 and provides the data input to flip-flop 197. The output of flip-flop 197 provides a SR clock signal on line 199 to printer 300.

Flip-flop 196 can be set by a signal from OR circuit 169 which is fed by inverter 167 and AND circuit 168. AND circuit 168 receives the horizontal retrace signal on line 33 and an input from AND circuit 166. Because of the odd-even data arrangement, the CRT clock signal on line 34 is divided so as to become the SR clock signal on line 199. This clock signal must always originate starting at a particular level and the output of OR circuit 169 functions to do this when AND circuit 166 passes a signal and functions to hold flip-flop 196 at a steady state when AND circuit 166 is deconditioned.

Figure 5:
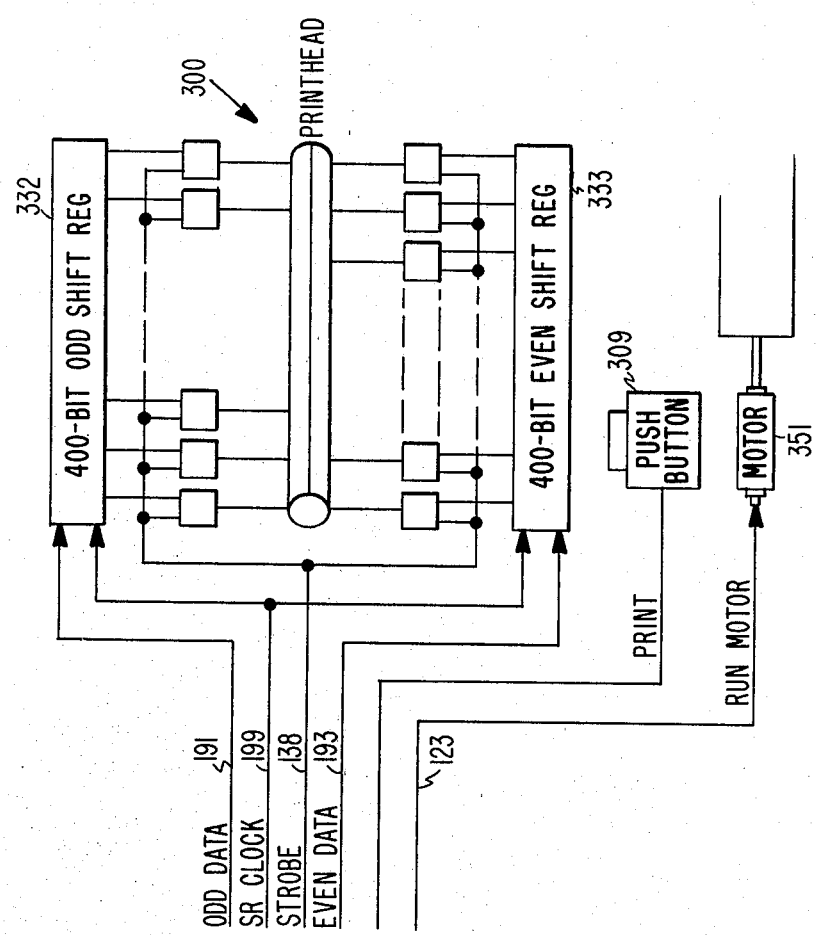
FIG. 5 is a schematic diagram of the line printer.

The serial video data set into flip-flops 190 and 195 is entered into shift registers 332 and 333 respectively of printer 300, FIG. 5. The SR clock signal on line 199 clocks the odd and even data into registers 332 and 333 respectively. Printing, however, does not take place until strobe latch 137, FIG. 3b, is set to provide a strobe signal on line 138. Strobe latch 137 is set by the output of AND circuit 136 which has an input from decode 132 and from the set output of enable latch 154. Decode 132 is connected to the output of display scan counter 130 and provides an output signal when counter 130 has a value of 1. Strobe latch 137 is reset by the output of decode 133. Decode 133 functions to detect when counter 130 has reached a count of 90. Thus the strobe signal is present during the first 90 horizontal scans to provide a signal for actuating the print heads of printer 300. Display scan counter 130 is incremented by the horizontal retrace signal on line 33 and reset by the vertical retrace signal on line 32. The last line is again reached when decode 135 detects that 336 horizontal scans have been counted. As seen in FIG. 4, printing takes place shortly after the last line has been detected for the third time.

After the first scan of the last line has been printed, the vertical retrace signal on line 32 increments print counter 148 to a value of 2 and compare circuit 175 will no longer have an output until last line scan counter 156 reaches a value of 2. The print latch 165, remains set until reset by the output of decode 170 which detects when print counter 148 has reached a value of 15.

Print counter 148 is reset either after a value of 15 or a value of 16 depending upon whether or not AND circuit 171 passes a signal to OR circuit 181. AND circuit 171 has an input from decode 170 and an input from AND circuit 110. The other input into OR circuit 181 is from decode 180 which detects when counter 148 has a value of 16. The output of OR circuit 181 is applied to reset print counter 148. Thus when AND circuit 110 has an output, counter 148 is reset after it reaches a value of 15 and an End Print interrupt signal on line 172 is sent to microprocessor 11, FIG. 2. If there isn't an output from AND circuit 110, AND circuit 171 will not be conditioned to pass a signal and print counter 148 will not be reset after it reaches a value of 15 but it will be reset when it reaches a value of 16 as detected by decode 180.

The End Print interrupt signal on line 172 indicates to microprocessor 11 that a line of printing has been completed and the next line to be printed can be transferred from storage 20 to CRT controller 25. Thus, if there is another line to be printed, AND circuit 110 will be conditioned prior to counter 148 reaching a value of 16 and motor control latch 122 will not be reset as it would have been had counter 148 been permitted to reach a value of 16. Thus the second line of printing can take place in the same manner as the first line of printing takes place. When there are no more additional lines to be printed, print counter 148 reaches a value of 16 whereby motor control latch 122 is reset and in turn enable latch 154 is reset. Of course when motor control latch 122 is reset, the Run Motor signal on line 123 is no longer present and print motor 351 turns off.

From the foregoing it is seen that the present invention enables conversion of a display screen copier printer to a line printer for printing data independent of the display screen terminal but yet using the display screen terminal as a print line buffer. The data to be printed is serialized in the same manner as if it were to be displayed. The display screen of the terminal, however, is blanked as the print data is being serialized. Thus the print data does not appear on the display screen of the terminal. The time at which the print data is being serialized is determined by detecting the last line of the display screen terminal. The last line of the display screen terminal consists of a plurality of horizontal scans and the serial video data for the first scan is printed. The display screen terminal is then allowed to function in its normal manner until the last line is again reached. The display screen is then again blanked and the line printer is again enabled whereby the serialized video data for the second scan line of the last line is printed. The process repeats until all scans of the last line are printed.

We claim:

1. A line printer attachment for a line printer having a number of print elements corresponding to horizontal row of video dot positions in a display screen terminal having display storage for storing data to be displayed, a display screen controller connected to receive display data from said display storage and operable to generate video control signals, a character generator connected to receive display data from said display screen controller and convert said display data to displayable data, video serializer means connected to receive said displayable data from said character generator and operable to serialize said displayable data into serial video data and responsive to video control signals from said display screen controller to generate horizontal, vertical and display clocking signals, and a display screen for displaying said serial video data along said horizontal rows of dot positions, said line printer having buffer means for buffering said serial video data in response to a print initiate signal, comprising:

print initiate means responsive to signals from said video serializer for generating a print initiate signal when the last line is to be displayed by said display screen terminal, and gating means connected to receive said serial video data from said video serializer means and to receive said print initiate signal and operable to pass said serial video data to said display screen in the absence of said print initiate signal and to block said serial video data from passing to said display screen during the presence of said print initiate signal and instead pass said serial video data to said line printer.

2. A line printer attachment for attaching a line printer to a display screen terminal where said display screen terminal includes display means for displaying data by forming a plurality of horizontal rows of illuminated dots in response to a stream of serialized video data and where said line printer has a horizontal row of print elements corresponding to the number of dot positions in one of said plurality of horizontal rows of said display screen terminal, a selectively operable motor for moving media relative to said print elements, buffer means for storing video data to be printed, selectively operable control means operable in response to a strobe signal from said line printer attachment for selectively actuating said print elements in accordance with the serialized video data entered in said buffer means, said line printer attachment including selectively operable strobe signal generating means for generating said strobe signal in a timed relationship with displaying said plurality of said horizontal rows of illuminated dots, the improvement of said line printer attachment comprising:

signal generating means for generating a last line signal in a timed relationship with the last line of horizontal rows of illuminated dots to be displayed, print initiate means for generating a print initiate signal in response to said last line signal, gating means responsive to said print initiate signal for blocking said serial video data from said display means and passing said serial video data to said buffer means, and control means responsive to said print initiate signal for rendering said motor and said strobe signal generating means operable whereby said horizontal row of print elements of said line printer are activated by the serial video data in said buffer means to print a horizontal row of dots.

3. The line printer attachment of claim 2 wherein said last line of horizontal rows of illuminated dots consists of 14 horizontal rows of illuminated dots.

4. The line printer attachment of claim 2 wherein said gating means includes first counting means for indicating which horizontal row of said horizontal rows in said last line corresponds to serial video data to be printed and second counting means for determining when the serial video data for the horizontal row to be printed is to be entered into said buffer means.

5. The line printer attachment of claim 4 where said second counting means includes a comparator connected to receive the indication from said first counting means.

6. A line printer attachment for attaching a line printer to a display screen terminal having display means for displaying data by forming a plurality of horizontal rows of illuminated dots in response to a stream of serialized video data and said line printer having a horizontal row of print elements corresponding to the number of dot positions in one of said plurality of horizontal rows displayable on said display screen terminal, a selectively operable motor for moving media relative to said print elements, buffer means for storing serial video data to be printed, selectively operable control means operable in response to a strobe signal from said line printer attachment for selectively actuating said print elements in accordance with the serialized video data from said buffer means, said line printer attachment including selectively operable strobe signal generating means for generating said strobe signal in a timed relationship with the displaying of said plurality of horizontal rows of illuminated dots, the improvement of said line printer attachment comprising:

gating means for selectively gating only a predetermined group of serial video data scans to said buffer means and, means for inhibiting the display of said predetermined group of serial video data scanned on said display screen.

* * * * *